United States Patent [19]

Hall

[11] Patent Number: 4,915,823

[45] Date of Patent: Apr. 10, 1990

[54] ASSEMBLY FOR THE SEPARATION OF OIL FROM WATER

[76] Inventor: Thomas W. Hall, 4120 NE. 22nd Ter., Lighthouse Point, Fla. 33064

[21] Appl. No.: 271,590

[22] Filed: Nov. 14, 1988

[51] Int. Cl.[4] ........................................ B01D 17/032
[52] U.S. Cl. .................................. 210/95; 210/255; 210/299; 210/519; 210/521
[58] Field of Search ................ 210/95, 255, 295, 299, 210/320, 513, 519, 521, 522, 539

[56] References Cited

U.S. PATENT DOCUMENTS

| | | | |
|---|---|---|---|
| 365,259 | 6/1887 | Ide | 210/95 |
| 378,431 | 2/1888 | Clarke et al. | 210/299 |
| 569,016 | 10/1896 | Darrow | 210/95 |
| 654,965 | 7/1900 | Franke | 210/95 |
| 659,638 | 10/1900 | Bishoff | 210/95 |
| 745,519 | 12/1903 | Pravicha et al. | 210/513 |
| 745,754 | 12/1903 | Adams | 210/320 |
| 782,065 | 2/1905 | Shaler | 210/513 |
| 2,205,336 | 6/1940 | Beach | 210/519 |
| 3,849,311 | 11/1974 | Jakubek | 210/539 |
| 3,913,513 | 10/1975 | Pedone | 210/194 |
| 3,977,975 | 8/1976 | Geurtsen | 210/522 |
| 4,014,786 | 3/1977 | Potter et al. | 210/519 |
| 4,014,791 | 3/1977 | Tuttle | 210/519 |
| 4,031,839 | 6/1977 | Pedone | 210/242.4 |

FOREIGN PATENT DOCUMENTS 568072  12/1958  Canada .
8302768  8/1983  PCT Int'l Appl. .

OTHER PUBLICATIONS

Publication by Pace, "S Series Oil/Water Separator Complete Package Systems", 9/87.
Publication by West Falia Separator, "Mineral Oil Separators".
Publication by West Falia Separator, "OTB2 Mineral Oil Separator".
Publication by Sarex, "Sarex Oily Water Separator".

*Primary Examiner*—Peter Hruskoci
*Assistant Examiner*—Christopher Upton

[57] ABSTRACT

A device for separating the oil from an oil/water mixture collected in the bilge of a marine craft immediately prior to draining water from the craft in order to meet U.S. Coast Guard standards and eliminate or substantially reduce the discharge of pollutants, such as oil, into waterways when the bilge pump of the marine craft is activated in the conventional manner.

15 Claims, 2 Drawing Sheets

ASSEMBLY FOR THE SEPARATION OF OIL FROM WATER

BACKGROUND OF THE INVENTION

1. Field of the Invention

This invention relates to an oil and water separation assembly wherein the oil normally collected with the water in the bilge of a marine craft, and mixed therewith, is substantially separated from the water prior to discharge overboard in the waterways or body of water in which the craft operates to the extent that the oil may be removed and collected separately for safe and clean discharge.

2. Description of the Prior Art

Federal regulations prohibit the discharge of oil or other pollutants or hazardous substances into the waterways of the United States through enactment of the Federal Water Pollution Control Act. Such regulations include the prohibition of pumping, pouring or discharging any kind of oil including fuel oil, gasoline, lubricating oil or oil/water mixtures normally collected in the bilge of marine vessels.

It is common practice for boats with inboard engines to collect water in their bilges along with pollutants such as fuel oil, gasoline, lubricating oil, etc. which are frequently mixed therewith. It is also common practice to provide a bilge pump to remove such collected oil/water mixture prior to starting of the engine and during operation of the engine. Accordingly, the bilge pump is periodically operated to further remove the combined oil and water mixtures during the operation of the craft. Unless separated prior to discharge, the oil in the oil/water mixture constitutes the discharge of harmful pollutants in that a significant quantity of oil is frequently accumulated.

Accordingly, in an attempt to overcome the problems as outlined above, in inboard marine craft, used for either commercial or recreational purposes, the prior art has developed filtering systems of the type disclosed in U.S. Pat. Nos. 3,913,513 and 4,031,839, to Pedone. The inventions disclosed in these U.S. Patents include the use of an oil filter for removing the oil pollutants from an oil/water mixture collected in the bilge of a boat wherein the filter has layers of different size expanded resin particles that are hydrophobic and oleophilic. However, certain disadvantages are acknowledged to be associated with this type of filtering system which generally relate to the creation of back pressure that would otherwise be caused by the filter to facilitate start-up of the bilge pump. Prior art systems of this type utilizing a filter also include inherent limitations in that a filter element commonly only collects approximately 50% to 60% of the absorbent potential of the filter structure. Accordingly, the replacement or cleaning of the filter is a constant problem. Also certain indicating devices are used and are visible on the exterior of the boat to provide a visual indication as to when the filter needs changing.

Accordingly, even in light of the prior art attempts, as generally outlined above, there is still a need for an efficient and reliable separation assembly which will clearly remove significant amounts of oil type pollutants from an oil/water mixture normally collected in the bilge of a marine craft.

SUMMARY OF THE INVENTION

The present invention is directed towards a separation assembly specifically for the separation of oil from what may be considered an oil/water mixture of the type typically collected in the bilge of a marine craft. While the environment to be described in greater detail hereinafter is for relatively small inboard boats, it should be emphasized that the assembly of the present invention is of course adaptable for other applications or environments other than that of a marine craft.

The assembly of the present invention includes a container with a hollow interior designed to hold, in a leak-free manner, the liquid received from the bilge of the marine craft. More specifically, an inlet means includes an inlet conduit connected in liquid receiving relation directly to the output of the bilge pump. The inlet means may further include a fill conduit disposed on the interior of the container and extending upwardly therein so as to direct incoming liquid flow from the bilge pump preferably to an upper end of the container. More specifically, the fill conduit serves to direct the incoming oil/water mixture in a generally upward direction to the upper end of the holding container so that it will exit on an upper exposed surface of a dispersion plate. The dispersion plate preferably has a circular configuration and serves to substantially direct the water issuing from the fill conduit radially outward along what may be referred to as a transversely oriented dispersion surface. Flow of the water from the discharge end of the fill conduit along the exposed and transversely oriented dispersion surface of the dispersion plate effectively transforms the water/oil mixture into a thin, almost sheet-like configuration, as it passes down into the interior of the container. In a preferred embodiment, the dispersion plate effectively may float on the upper surface of the contained liquid within the container and in concentric, movable relation about the fill conduit. A central aperture formed in the dispersion plate is dimensioned so as to not pass over an enlarged head or stop portion formed on the discharge end of the fill conduit. Movement of the dispersion plate relative to the fill conduit, however, is provided since the central aperture of the dispersion plate is greater than the diameter of the fill conduit. This in effect serves to "thin" the oil/water mixture and aids in the separation of the oil from the water. Due to the natural tendency of oil substances and like materials to "float" on the upper surface of collected water, the oil/water mixture will eventually separate to the extent that the collected water separated from the oil will be collected in the lower portion of the container and any oil pollutant material will ride on the upper surface thereof.

A discharge means is also located at least partially on the interior of the container and has an open interior discharge end for the collection of the separated water, now substantially free of the oil pollutants. The collected water is discharged overboard from the interior of the container without fear of polluting the waterway receiving the discharged water. In addition, an oil outlet means is also mounted on the container generally at an upward or raised level from the point of collection of the separated water by the discharge conduit. Also, the location of the oil outlet means which may be valved to regulate removal of the separated oil from within the container is preferably mounted at a point of normal collection of the separated oil based upon the average amount of water and oil collected on the interior of the container.

A vent means may be structured to vent not only the interior of the container to allow filling thereof, but also may include additional venting structure to vent the discharge conduit itself in order to prevent any type of syphoning effect from the discharge pipe.

Other structural features present in the assembly include various filtering, screening, valving and the like to accomplish sufficient and effective operation of the device in a carefree and reliable manner. The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
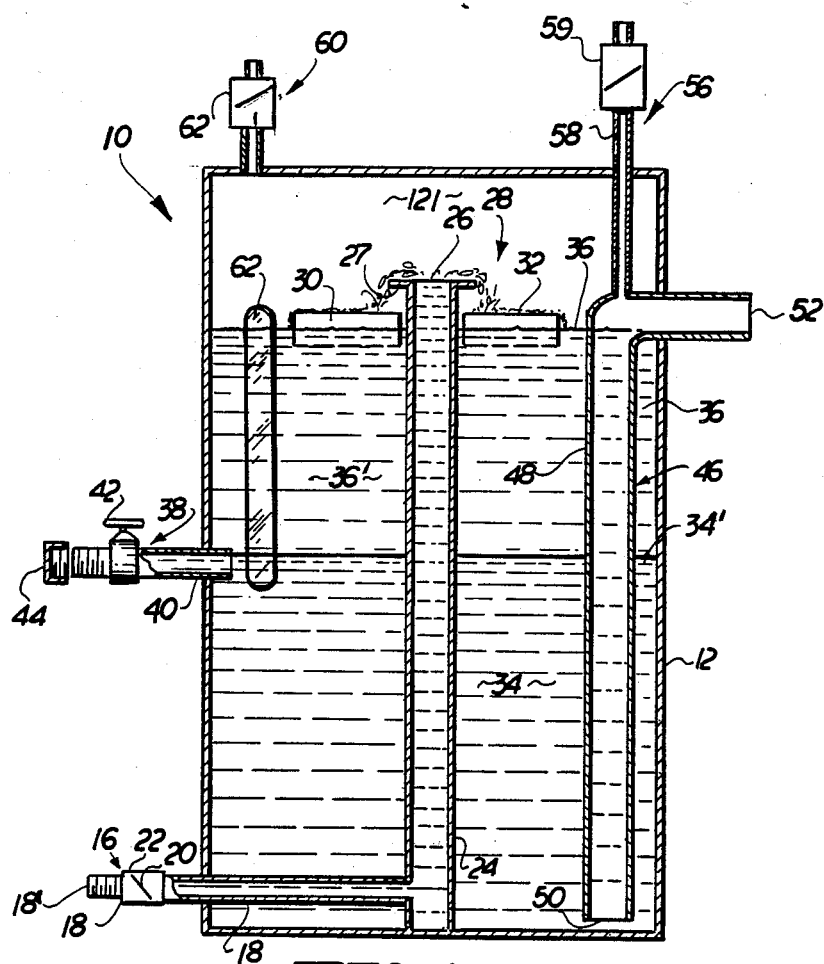
FIG. 1 is a sectional view in schematic form of the assembly of the present invention.

As shown in FIG. 1, the separation assembly of the present invention is generally indicated as 10 and includes a container 12 preferably having an elongated configuration and a generally upstanding orientation when in its operative position. The container of course has a hollow interior 14 and the container itself is structured to hold liquid, such as an oil/water mixture so that no leakage occurs.

The subject assembly also comprises an inlet means indicated in part generally as 16 and including an inlet conduit 18 which is normally connected directly to the output of a conventional bilge pump. Also in conventional practice, the bilge pump is of course placed to remove water or more specifically an oil/water mixture collected in the bilge prior to starting of the engine and continuously while the engine and craft is in operation. The inlet conduit may include a screen member as at 20 as well as a one-way check valve as at 22 both to prevent larger particles from accumulating within the interior 14 of the container 12 and to prevent inadvertent backflow to the bilge pump when it ceases operation. The inlet conduit 18 extends from its connection at a receiving end 18' with the bilge pump into the interior of the container to a point of connection and liquid transfer to an elongated interiorly mounted fill conduit 24.

Figure 2:
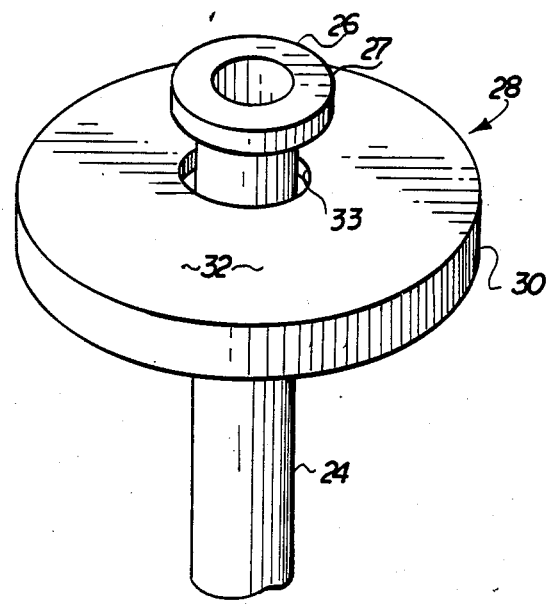
FIG. 2 is a perspective view in partial cut-away of the embodiment of FIG. 1.

A dispersion means generally indicated as 28 is disposed in liquid receiving relation to the open end 26 of the fill conduit 24 so as to outwardly disperse the oil/water mixture issuing from the open end 26. The dispersion means 28 comprises a dispersion plate 30 having an outer exposed surface 32 directed transversely outward from the fill pipe 24. The plate 30 further has a central opening or aperture 33 and, as shown in detail in FIG. 2, is disposed in surrounding relation to the fill pipe 24.

The upper or discharge end 26 of the fill pipe 24 includes an enlarged outwardly extending head portion 27 being sufficiently larger than the central aperture 33 so as to prevent removal of the plate 30 from its surrounding, concentric relation to the fill pipe 24. However, the opening 33 does have a sufficient diameter or dimension to allow relative movement of the dispersion plate 30 since it is disposed to float on the upper surface 36' as clearly shown in FIG. 1. Further, since dispersion plate 30 floats on the surface 36', the aperture 33 must be sufficiently larger than the diameter of the fill pipe 24 so as to allow dispersion plate 30 to assume any level of the surface of liquid 36 on which it floats such as when the boat is not maintained in a true horizontal position. As represented in FIG. 1, the dispersion plate 30 is essentially maintained in floating position on the liquid level 36 within the container 12, even when the boat rocks or when the boat is maintained in a non-level position when docked or the like.

Once the oil/water mixture strikes the transversely oriented and outwardly, radially extending surface 32, it is forced into a substantially planer, sheet-like flow which has the effect of "thinning" the oil/water mixture. This thinning sheet-like flow of the mixture, after contacting the dispersion surface 32 aids in the separation of the oil from the water. The liquid mixture issuing from outlet 26 then falls off the outer periphery of the exposed surface 32 a small distance to the surface level 36'.

After contact, both the oil and the water, now at least partially separated, fall down into the interior of the container 12, due to gravity. After at least a brief settling period, the water, now being effectively separated, is indicated as at 34, collects in the lowermost end of the container 12. The oil, however, having a natural tendency to float on the surface 34' of the separated and collected water 34 may be removed through an oil outlet means generally indicated as 38. Such oil outlet means may merely comprise an outlet pipe 40 controlled by a manual operated valve mechanism 42 and being capped for purposes of safety as at 44. Such oil, after separation and collection, can be removed for storage and safe disposal. However, the water 34 can be continuously removed for discharge overboard into the waterway or body of water on which the marine craft is supported. Alternately, the water 34 can be directed back into the bilge pump until the bilge water is free of oil. At this time the bilge pump can pump the water directly overboard rather than going through the container 12. Removal of water 34 from within the container 12 is accomplished by a discharge means generally indicated as 46 in the form of a discharge conduit 48. The discharge conduit has an intake open end 50 located generally at the lower end of the container 12 so as to be far removed from the collected and separated oil 36. An effective syphoning of the water will occur forcing the water to travel up through the length of the discharge conduit 46 and out through a preferably exteriorly located outlet end 52. The diameter of conduit 48 is preferably at least as large as that of fill conduit 24 to prevent back-pressure. A hose or like attachable conduit may be connected to the end 52 and disposed overboard or at any convenient location such that the end of any hose will be located below the surface 36.

Proper venting of the container 12 also occurs by vent means 56 including a first venting structure 58 establishing fluid communication between the interior of the discharge conduit 48 and the exterior of the container 12 as shown. In addition, the interior of the container may best be vented to facilitate filling of the container by the oil/water mixture. To this end a second vent structure 60 is provided in an attached and fluid communicating position relative to the interior 14 of container 12.

For purposes of observation, an elongated window or like structure as at 62 may be formed in the wall of the container 12. The viewing structure 62 has a sufficiently elongated configuration to mark the respective levels of the oil 36' and/or water 34'.

Other structural features of the present invention may be shown in FIG. 1. For purposes of reducing the pressure of the oil/water mixture prior to it being directed on to the dispersion surface 32, the transverse dimension or diameter of the fill conduit 24 is greater than the inlet conduit 18 specifically for the purposes of reducing such fluid pressure at the point of exit or the discharge end 26 of the fill conduit 24.

In addition, each of the vent means 56 and 60 may include check valve structures 59 and 62 respectively in order to prevent any inadvertent liquid flow from the interior of the container through the vent means 56 or 60.

Figure 3:
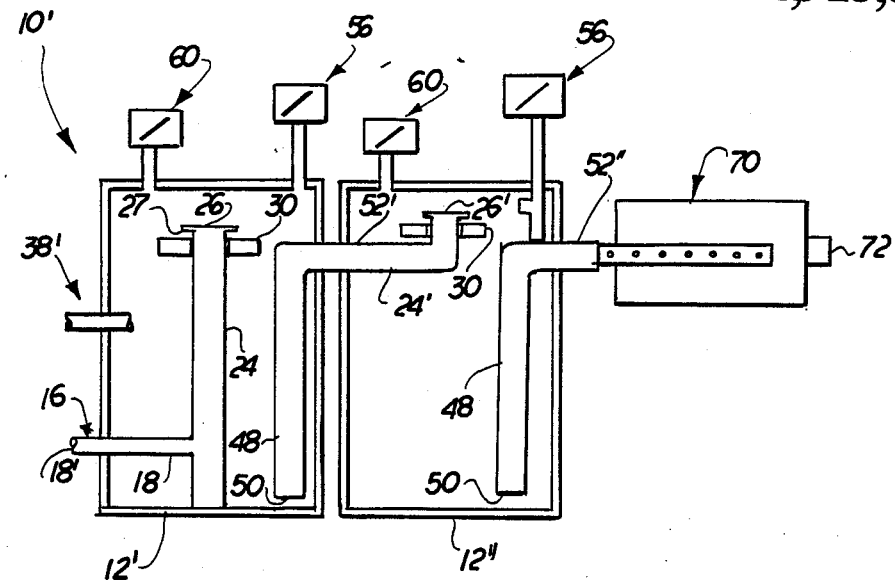
FIG. 3 is a schematic representation of another embodiment of the present invention.

FIG. 3 of the present invention relates to yet another embodiment wherein the assembly includes a plurality of containers 12' and 12". It should be emphasized that while only two containers are arranged in series and direct communicating relation to one another, more than two such containers could in fact be included in an assembly of the subject invention having a plurality of such containers. The purpose of a series, successive type orientation of a plurality of collection containers 12' and 12" is to increase the "purity" or reduce, as much as possible, the pollutant content of the water issuing from the system. In such an embodiment, the basic components are the same to the extent that a first container 12' includes an inlet conduit having a receiving end 18' communicating with any type of bilge or delivery system and further wherein the inlet conduit 18 communicates with a fill conduit 24. The fill conduit 24 further directs the oil/water mixture to a discharge end 26 having an enlarged head portion 27 cooperatively disposed in containing relation to a dispersion plate 30 on which the oil/water mixture is delivered especially relative to the exposed surface 32. The water portion, similar to the embodiment of FIG. 1, once separated from the oil component of the oil/water mixture is next delivered by a discharge conduit 48 after it is received in the receiving end 50 thereof to the next successively disposed container 12". The discharge end as at 52 of the embodiment of FIG. 1 is now indicated as 52' and directly communicates with the discharge end 26 of what may be a modified fill conduit 24' as shown in FIG. 3. A dispersion plate 30 is also utilized to again separate any oil/water mixture issuing from the discharged end 26' maintained within the container 12". Means of exiting the separated water again occurs through the receiving end 50 of the discharge conduit 48. Even greater "purity" or reduction of pollutants in the issuing stream may be ensured by the existence of a filtering means 70 disposed on the discharge end 52" wherein the liquid or water after being filtered issues from a discharge end 72 from the filter means 70. The filter means 70 may take any standard and/or commercially available configuration as is well known.

Take off or removal of the separated oil portion (not specifically shown for purposes of clarity) is accomplished in each of the tanks 12' and 12" through the provision of the take off conduits 38' as shown in FIG. 3.

Another feature of the embodiment of FIG. 3 is the possible inclusion of a suction pump 71 represented schematically which may be attached to the discharge end as at 52" of the container 12". The activation of such a suction pump will cause a forced fluid flow of the incoming oil/water mixture through conduit 18', 18 and further from the interior of the container 12' by inlet 50 of conduit 48 thereof into the interior of the container 12". Continued activation of the suction pump 71 will cause the withdrawal of the separated water through the inlet 50 of the conduit 48 within the container 12" to a point where it is subjected either to immediate discharge or the further purifying action of the filter 70 as set forth above.

Now that the invention has been described,
What is claimed is:

1. An oil and water separation assembly primarily used on marine craft for separating pollutants from water discharged from the bilge of the craft, said assembly comprising:
   a. a container structured to hold liquid and having an elongated configuration oriented in a substantially upright position,
   b. inlet means for allowing an inflow of oil/water mixture into said container and including a fill conduit having an open discharge end located at an upper interior end of the container,
   c. dispersion means mounted in liquid receiving and contacting relation to said discharge end of said fill conduit and structured and configured to dispense liquid flow issuing from said discharge end in a transverse, substantially radial path of flow relative thereto,
   d. said dispersion means comprising a dispersion plate movably disposed relative to said fill conduit and having a dispersion surface extending outwardly from said fill conduit and disposed in liquid receiving relation to the oil/water mixture issuing from said discharge end of said conduit,
   e. a discharge means at least partially located at a bottom end of said container in receiving relation to separated water for the exiting thereof from the container interior,
   f. oil outlet means located above said discharge means and in fluid receiving relation to separated oil floating on the surface of the collected and separated water, and
   g. vent means on said container for venting interior portions of the container to atmosphere.

2. An assembly as in claim 1, wherein said inlet means comprises an inlet conduit connectable to a source of oil/water mixture exteriorly of said container and to said fill conduit located interiorly of said container.

3. An assembly as in claim 2 wherein said fill conduit extends from said inlet conduit to said discharge end and is disposed along its length on the interior of said container.

4. An assembly as in claim 3 wherein said fill conduit comprises a transverse dimension sufficiently greater than said inlet conduit to reduce fluid pressure at said discharge end to a lesser degree than the fluid pressure of said inlet conduit.

5. An assembly as in claim 3 wherein said fill conduit is disposed along its entire length within said container and extends along at least a majority of the length of said container from a lower end to an upper end thereof.

6. An assembly as in claim 1 wherein said discharge means comprises a discharge conduit having an elongated configuration extending from a receiving, proximal end disposed at a lower end of said container to an outlet end exiting said container at substantially an upper end thereof.

7. An assembly as in claim 6 wherein said outlet end of said discharge conduit is disposed at a level within said container beneath said discharge end of said fill conduit.

8. An assembly as in claim 7 wherein said vent means comprises a first vent structure disposed to establish fluid communication between said discharge conduit and the exterior of said container.

9. An assembly as in claim 1 wherein said dispersion plate comprises a substantially central aperture having a diameter larger than the transverse dimension of said fill conduit; said fill conduit disposed within said central aperture and said dispersion plate disposed in floating relation to the upper surface of liquid within said container and movable therewith relative to the fill conduit.

10. An assembly as in claim 9 wherein said fill conduit comprises an enlarged stop portion secured to the fill conduit adjacent said discharge end thereof, said stop portion having a transverse dimension larger than said central aperture of said dispersion plate, whereby said dispersion plate is prevented from passing over said discharge end of said fill conduit.

11. An assembly as in claim 1 further comprising a viewing structure mounted on said container and extending along at least a portion of the length thereof and disposed to allow visual observation of the contents of said container at a disposition corresponding to the surface junction between oil and water within the container.

12. An assembly as in claim 10 further comprising a filter means attached to said discharge means for filtering pollutants from liquid issuing said discharge means.

13. An oil/water separation assembly primarily used on marine craft for separating pollutants from water discharged from the bilge of the craft, said assembly comprising:
   a. a container means comprising a plurality of holding containers for holding liquid and each having an elongated configuration oriented in a substantially upright position and disposed in successive, fluid communicating relation with one another,
   b. inlet means for allowing an inflow of oil/water mixture into a first of said plurality of holding containers and including a fill conduit having an open discharge end located at an upper interior end of said first container,
   c. dispersion means mounted in liquid receiving and contacting relation to said discharge end of said fill conduit within said first container and structured and configured to dispense liquid flow issuing from said discharge end in a transverse, substantially radial path of flow relative thereto,
   d. a discharge means at least partially located at a bottom end of said first container in receiving relation to separated water for the exiting thereof from the first container interior,
   e. oil outlet means located above said discharge means and in fluid receiving relation to separated oil floating on the surface of the collected and separated water,
   f. vent means on said first container for venting interior portions of said first container to atmosphere,
   g. a second of said plurality of containers including an inlet means connected in fluid receiving relation to said discharge means of said first container and including an open discharge end extending into the interior of said second container,
   h. dispersion means mounted in liquid receiving and contacting relation to said discharge end of said fill conduit within said second container and structured and configured to dispense liquid flow issuing from said discharge end in a transverse, substantially radial path of flow relative thereto,
   i. said dispersion means of each of said first and second containers each comprising a dispersion plate movably mounted relative to a respective one of said fill conduits and having a substantially outwardly extending dispersion surface disposed in liquid receiving relation to the oil/water mixture issuing from a receptive one of said discharge ends of a respective one of said fill conduits,
   j. a discharge means at least partially located at a bottom end of said second container in receiving relation to separated water for the exiting thereof from an interior of said second container,
   k. oil outlet means located above said discharge means of said second container and in fluid receiving relation to separated oil floating on the surface of the collected and separated water, and
   l. vent means on said second container for venting interior portions of said second container to atmosphere.

14. An assembly as in claim 13 wherein each of said dispersion plates further comprises a substantially central aperture having a diameter larger than the transverse dimension of a respective one of said fill conduits; said respective fill conduits disposed within said central aperture and said dispersion plates disposed in floating relation to the upper surface of liquid within a respective one of said first and second containers and movable therewith relative to the respective fill conduits.

15. An assembly as in claim 14 wherein said respective fill conduits each comprise an enlarged stop portion secured to the respective fill conduit adjacent the discharge end thereof, each of said stop portions including a transverse dimension larger than said central aperture of the respective ones of said discharge plates, whereby said respective discharge plates are prevented from passing over said respective discharge ends of said fill conduit.

* * * * *